(12) United States Patent
Bookbinder et al.

(10) Patent No.: US 6,430,350 B1
(45) Date of Patent: Aug. 6, 2002

(54) OPTICAL DEVICE HAVING AN OPTICAL COMPONENT ISOLATED FROM HOUSING

(75) Inventors: Dana C. Bookbinder, Corning; Joel P. Carberry, Horseheads; Brent M. Wedding; David L. Weidman, both of Corning, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/529,328

(22) PCT Filed: Sep. 25, 1998

(86) PCT No.: PCT/US98/20042

§ 371 (c)(1),
(2), (4) Date: Apr. 11, 2000

(87) PCT Pub. No.: WO99/19755

PCT Pub. Date: Apr. 22, 1999

Related U.S. Application Data

(60) Provisional application No. 60/061,688, filed on Oct. 10, 1997.

(51) Int. Cl.[7] .................................................. G02B 6/00
(52) U.S. Cl. ....................................................... 385/136
(58) Field of Search ................................. 385/136–137, 385/37, 99

(56) References Cited

U.S. PATENT DOCUMENTS

| 4,714,316 | A | * | 12/1987 | Moore et al. ............... 350/96.2 |
| 5,077,819 | A | | 12/1991 | Greil et al. .................... 385/79 |
| 5,299,727 | A | | 4/1994 | Kofler .......................... 228/177 |
| 5,444,804 | A | * | 8/1995 | Yui et al. ........................ 385/49 |
| 5,574,810 | A | | 11/1996 | Byron et al. .................... 385/37 |
| 5,641,956 | A | | 6/1997 | Vengsarkar et al. ... 250/227.14 |
| 5,708,739 | A | | 1/1998 | Patton .......................... 385/37 |
| 5,778,119 | A | | 7/1998 | Farries ......................... 385/37 |

* cited by examiner

Primary Examiner—Akm E. Ullah
Assistant Examiner—Jerry T. Rahll
(74) Attorney, Agent, or Firm—Kevin A. Oliver; Foley Hoag LLP (57) ABSTRACT

An optical device comprises an optical waveguide component, a housing for the optical waveguide component, and a connecting portion that attaches the optical waveguide component to the housing while substantially completely isolating the optical waveguide component from force imposed on the connecting portion due to a dimensional change of the housing caused by a variation in ambient conditions.

24 Claims, 4 Drawing Sheets

OPTICAL DEVICE HAVING AN OPTICAL COMPONENT ISOLATED FROM HOUSING

This application claims priority to U.S. patent application Ser. No. 60/061,688 filed on Oct. 10, 1997, which is hereby incorporated by reference.

FIELD OF THE INVENTION

The present invention relates to an optical device and, more particularly, to an optical device having an optical component isolated from a housing.

DESCRIPTION OF THE RELATED ART

A reflective or Bragg grating, which reflects light over a narrow wavelength band, can be established in an optical waveguide fiber (optical fiber) by known methods to produce a precise optical waveguide component that typically has channel spacings measured in nanometers. Such a fiber Bragg grating component can be used, for example, as a filter in a telecommunications system.

A change in the temperature of the grating region of the optical fiber can shift the central wavelength of the fiber Bragg grating component because of changes in glass refractive index and physical expansion of the fiber. Thus, the fiber Bragg grating component can exhibit wavelength variability over a range of operating temperatures. This temperature-induced variability can create practical difficulties in the use of the fiber Bragg grating component.

One method of passively athermalizing the fiber Bragg grating component involves changing the tension in the grating region of the optical fiber in response to temperature change. More specifically, since changing the tension in the grating region can shift the central wavelength of the fiber Bragg grating component, the central wavelength shift caused by temperature change can be offset by an appropriate change in the tension in the grating region.

This passive athermalization method can be implemented by attaching the optical fiber, under appropriate tension, to a substrate having a suitable negative temperature coefficient of thermal expansion. With a proper choice of design parameters, wavelength shift due to temperature change can be greatly reduced by an offsetting change in tension caused by a dimensional change in the substrate.

The fiber Bragg grating component is disposed in a housing to form an optical device in which the fiber Bragg grating component is protected from the environment. Conventionally, the substrate of the fiber Bragg grating component is connected directly to the housing by an adhesive covering an area on the substrate that averages about 80 square millimeters ($mm^2$), but can vary from 40 to 400 $mm^2$, with a thickness typically between 0.1 to 0.5 millimeters (mm).

Environmental testing, which involves monitoring the optical performance while cycling the temperature between −40° C. and 85° C., has shown that the central wavelength of the fiber Bragg grating component still shifts in an undesirable manner in response to temperature changes. This shift in the central wavelength may be caused, at least in part, by mechanical coupling of the substrate of the fiber Bragg grating component to the housing, which produces unwanted strain in the substrate when the housing undergoes dimensional changes caused by variations in ambient conditions, such as temperature and humidity.

SUMMARY OF THE INVENTION

An object of the present invention is to provide an optical device that solves the foregoing problems.

Another object of the present invention is to provide an optical device having a housing and an optical waveguide component that is substantially isolated or uncoupled from the housing.

Additional objects and advantages of the invention will become apparent from the description which follows. Additional advantages may also be learned by practice of the invention.

In a broad aspect, the invention provides an optical device including an optical waveguide component, a housing for the optical waveguide component, and a connecting portion that attaches the optical waveguide component to the housing while substantially completely isolating the optical waveguide component from force imposed on the connecting portion due to a dimensional change of the housing caused by a variation in ambient conditions.

In an additional aspect, the invention includes the method of making the inventive optical device, including the method of isolating the optical component.

It is to be understood that both the foregoing summary and the following detailed description are exemplary and explanatory only and are not restrictive of the invention as claimed.

BRIEF DESCRIPTION OF THE DRAWINGS

The invention will be described in conjunction with the accompanying drawings, which illustrate embodiments of the invention.

DESCRIPTION OF THE PREFERRED EMBODIMENTS

Reference will now be made in detail to the preferred embodiments of the invention.

Figure 1:
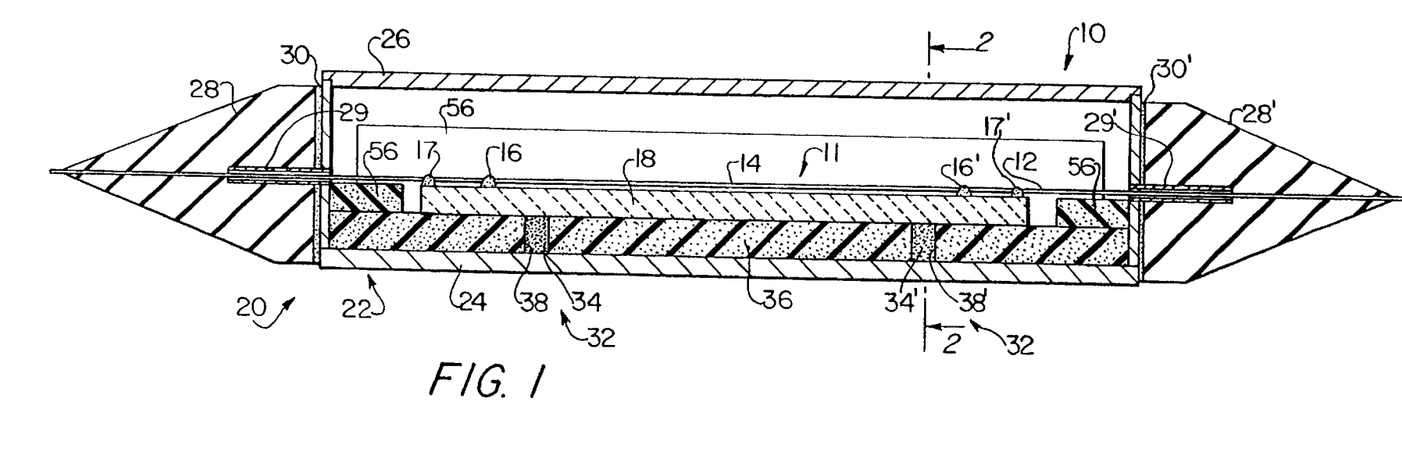
FIG. 1 is a sectional view of a first embodiment of an optical device according to the present invention.
Figure 3:
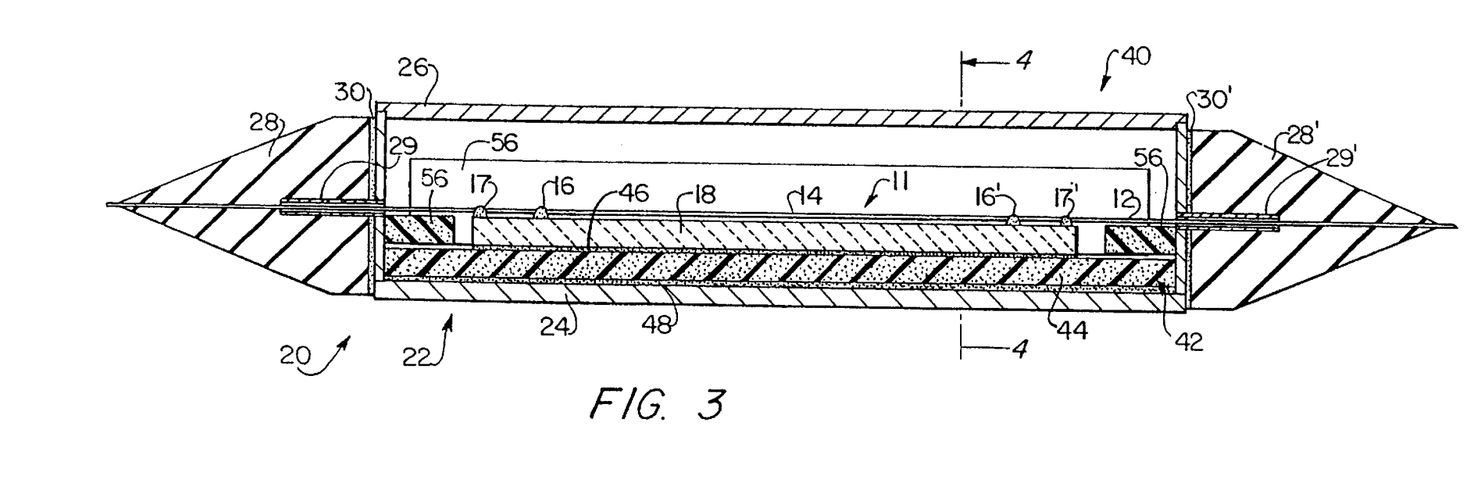
FIG. 3 is a sectional view of a second embodiment of an optical device according to the present invention.
Figure 5:
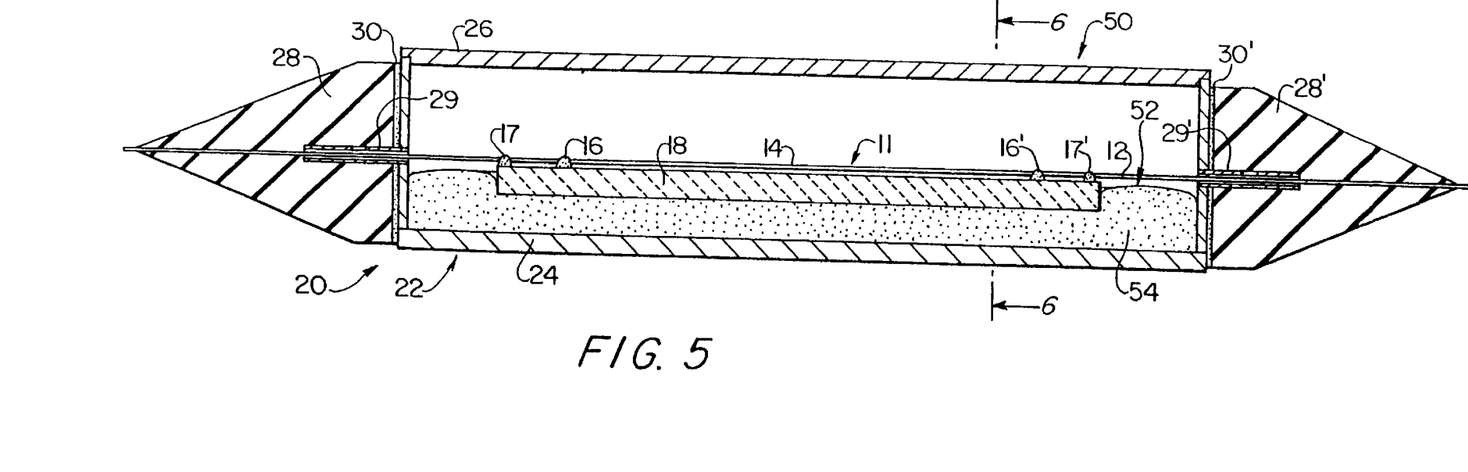
FIG. 5 is a sectional view of a third embodiment of an optical device according to the present invention.

As shown generally in FIGS. 1, 3, and 5, an optical device 10, 40, 50 according to the present invention comprises an optical waveguide component 11, a housing 20 for the optical waveguide component 11, and a connecting portion 32, 42, 52 that attaches the optical waveguide component 11 to the housing 20 while substantially completely isolating the optical waveguide component 11 from force imposed on the connecting portion 32, 42, 52 due to a dimensional change of the housing 20 caused by a variation in ambient conditions. The variation in ambient conditions could be, for example, a temperature or humidity change or a change in an external force imposed on the housing 20.

In each of the first through third embodiments, the optical waveguide component 11 includes an optical fiber 12 having a Bragg grating formed by conventional means in a grating region 14 extending for a portion of the fiber 12 between spaced frits 16 and 16', which hold the optical fiber 12 on a mounting member 18 under tension. Spaced epoxy attachments 17 and 17' grip the optical fiber so that longitudinal forces imposed on the optical fiber do not affect the grating region 14. The mounting member 18 is preferably formed of a beta-eucryptite glass-ceramic, which has a negative temperature coefficient of thermal expansion and thus passively athermalizes the optical waveguide component 11. The mounting member 18 could also be constituted by an arrangement of dissimilar materials constructed so as to impart an effective negative coefficient of thermal expansion on the optical fiber 12.

The housing 20 includes a casing portion 22, which has a base 24 and a lid 26. The casing portion 22 is typically bolted to a substrate (not shown). The housing 20 also includes two rubber end pieces 28 and 28', which are fitted over solder extensions 29 and 29' extending from the base 24. The rubber end pieces 28 and 28' are connected to sides of the base 24 by layers of a suitable adhesive 30 and 30'. The rubber end pieces 28 and 28' help to prevent the optical fiber 12 from bending proximate housing 20. The rubber end pieces 28 and 28' provide for a finite bend radius of the optical fiber 12 if a lateral load is imparted to the optical fiber 12 external to the housing 20.

The casing portion 22 of the housing 20 is preferably hermetic and formed of a material with low thermal expansion. Presently, gold-coated KOVAR®, which is a commercially available metal alloy, is the preferred low thermal expansion metal material for forming the casing portion 22. KOVAR® is an iron-nickel-cobalt alloy (29% Ni-17% Co-53% Fe) that has a nominal expansion coefficient of approximately 5 ppm/° C. (T.E.C. $5 \times 10^6$ at 20–400° C.) inflection temperature of about 450° C. with an $M_s$ temperature less than −80° C. Dilver-P alloy produced by Imphy, S. A., is a competitive grade with KOVAR® alloy of Carpenter Steel.

The casing portion 22 can also be formed of a molded material. For example, casing portion 22 can be formed by molding a liquid crystal polymer, such as VECTRA®. Like most such materials, the thermal expansion of VECTRA® is quite anisotropic, being strongly influenced by flow conditions during the molding operation. Thus, over time, temperature and humidity changes can cause the molded casing portion 22 to permanently bend or twist (warp). Temperature and humidity changes over time can also cause permanent linear dimensional changes of the molded casing portion 22. In conventional optical devices, the permanent warpage and linear dimensional changes typically occur after the optical waveguide component has been connected to the molded casing portion and thus cause an undesirable force to be imposed on the optical waveguide component.

In accordance with the present invention, the molded casing portion 22 can be subjected to post-molding annealing (preferably at 125 to 135° C. for 4 to 18 hours for VECTRA®) to cause the permanent warpage and linear dimensional changes to occur before insertion of the optical waveguide component 11. Post-molding annealing therefore significantly decreases the permanent dimensional changes, caused by a variation in ambient conditions, that occur after the optical waveguide component 11 has been connected to the housing 20.

For example, a 2.5 inch long VECTRA® molded casing portion was annealed at 125° C. for 16 hours, resulting in a permanent length decrease of 0.050 inches (about 2%). Thereafter, the molded casing portion did not undergo any substantial permanent warpage or linear dimensional changes.

Figure 2:
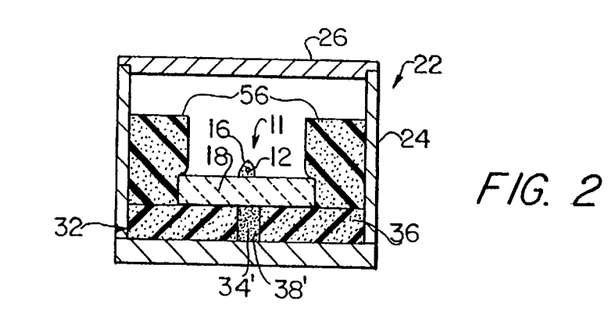
FIG. 2 is a sectional view of the first embodiment of the optical device taken along line 2—2 of FIG. 1.

In the first embodiment shown in FIGS. 1 and 2, the connecting portion 32 includes two discrete bodies of adhesive 34 and 34' that are bonded to the optical waveguide component 11 and the housing 20. The adhesive bodies 34 and 34' preferably have a shear modulus and dimensions such that the optical waveguide component 11 is substantially completely isolated from force imposed on the adhesive bodies 34 and 34' by the housing 20. More preferably, the adhesive bodies 34 and 34' include an adhesive with a low shear modulus (less than 1000 pounds per square inch (psi)) over the typical operating temperatures of −40° C. to 85° C. A particular silicone adhesive meeting this requirement is RTV-3145 (Dow Corning), which has a shear modulus that varies from 150 psi at −40° C. to about 75 psi at 80° C., and is about 100 psi at room temperature. Preferably the area of a portion of the optical waveguide component 11 bonded or fixed to a corresponding one of the bodies of adhesive 34 and 34' is about 2.5 to 15 mm² (total area of about 5 to 30 mm² for both bodies of adhesive), and the thickness of the bodies of adhesive 34 and 34' in a direction extending between the optical waveguide component: 11 and the housing 20 is approximately 1.2 mm. The bodies of adhesive 34 and 34' are preferably located as close to the center of the mounting member 18 as possible, while still being able to assure adhesion under conditions of mechanical shock and vibration, such as during shock testing.

The optical device 10 of the first embodiment further includes a spacer member 36 disposed between the optical waveguide component 11 and the housing 20. The spacer member 36 is not bonded to the optical waveguide component 11 or the housing 20. Although the spacer member 36 could be rigid, it preferably is flexible and has a low shear modulus over the typical operating temperatures and, more preferably, includes an elastomeric foam. A presently-preferred foam is PORON® S2000 silicone foam (Rogers Corporation), which was a shear modulus of 2 psi. The spacer member 36 has two holes 38 and 38' that accommodate the two bodies of adhesive 34 and 34', respectively.

Optical devices 10 can be manufactured uniformly and conveniently by placing the spacer member 36 having holes 38 and 38' in the casing portion 22 before inserting the bodies of adhesive 34 and 34'. Specifically, the spacer member 36 serves as a mold for the bodies of adhesive 34 and 34', with the thickness of the spacer member 36 determining the thickness of the bodies of adhesive 34 and 34', and the holes 38 and 38' controlling the width and location of the bodies of adhesive 34 and 34'. Therefore, optical devices 10 having uniformly sized and located bodies of adhesive 34 and 34' can be readily manufactured by using uniformly-dimensioned spacer members 36 and by using a precisely metered volume of adhesive.

Figure 4:
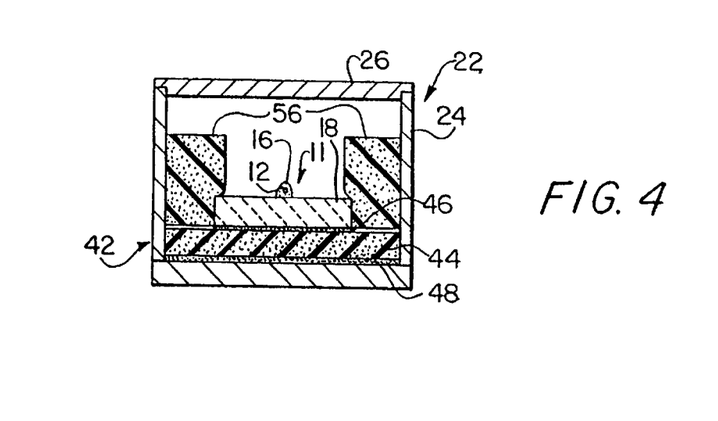
FIG. 4 is a sectional view of the second embodiment of the optical device taken along line 4—4 of FIG. 3.

In the second embodiment shown in FIGS. 3 and 4, the bodies of adhesive 34 and 34' are not used. Instead, the connecting portion 42 includes a flexible support member 44 disposed between the mounting member 18 of the optical waveguide component 11 and the housing 20 and bonded to them by layers of adhesive 46 and 48. The support member 44 preferably has a shear modulus and dimensions such that the optical waveguide component 11 is substantially completely isolated from force imposed on the support member 44 by the housing 20. More preferably, the support member 44 has a very low shear modulus (less than 100 psi) over the typical operating temperatures. Even more preferably, the support member 44 includes an elastomeric foam, such as PORON® S2000 silicone foam. The thickness of the support member 44 in a direction extending between the optical waveguide component 11 and the housing 20 is preferably about 0.8 mm.

The layers of adhesive 46 and 48 bond at least a portion of the upper surface of the support member 44 to the mounting member 18 of the optical waveguide component 11 and bond at least a portion of the lower surface of the support member 44 to the housing 20, respectively. The adhesive is preferably RTV-3145, although other adhesives, such as pressure sensitive adhesives, may be used. In the preferred embodiment, the total area of the optical waveguide component 11 (which is typically about 200 mm$^2$) is bonded or fixed to the portion of the surface of the support member 44.

Figure 6:
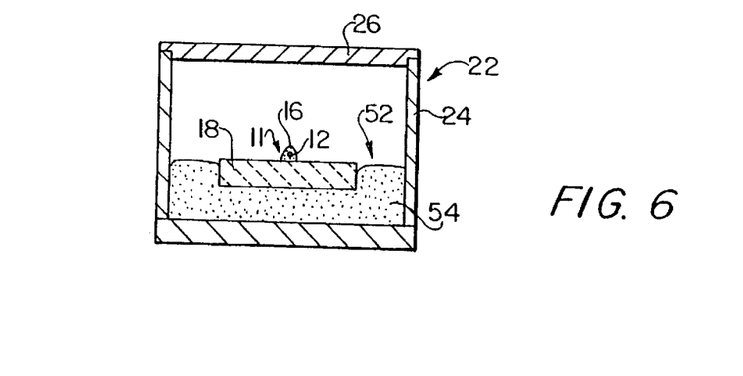
FIG. 6 is a sectional view of the third embodiment of the optical device taken along line 6—6 of FIG. 5.

In the third embodiment shown in FIGS. 5 and 6, the connecting portion 52 is constituted by a gel 54. The gel 54 preferably has a shear modulus and dimensions such that the optical waveguide component 11 is substantially completely isolated from force imposed on the gel 54 by the housing 20. More preferably, the gel 54 has a very low shear modulus (less than 100 psi) over the typical operating temperatures. Gels meeting this requirement include General Electric silicone gels RTV-6126, RTV-6136, RTV-6156, and RTV-6166, which all have a shear modulus of less than 2 psi. The optical waveguide component 11 can be secured to the housing 20 by placing the uncured gel 54 in the housing 20, inserting the optical waveguide component 11 into the gel 54, and curing the gel 54 by conventional means such as heat or ultraviolet radiation. The total area of the bottom surface of the optical waveguide component 11 is bonded or fixed to the gel 54 in the preferred embodiment, and the thickness of the gel 54 in a direction extending between the optical waveguide component 11 and the housing 20 is about 0.8 mm.

The presently preferred embodiments of the invention do not include force absorbing members 56, yet the first and second embodiments may further comprise force absorbing members 56 disposed between the optical waveguide component 11 and respective sides of the housing 20 to provide shock absorbing capability during use of the optical device 10, 40. The force absorbing members 56 are preferably formed of a silicone material such as PORON® S2000 foam or a solid silicone rubber. The force absorbing members 56 are preferably glued to one of the base 24 or the mounting member 18 by a suitable adhesive.

Having described preferred implementations of the invention, it is appropriate to address principles underlying the foregoing and other implementations of the invention. It has been determined, in connection with the present invention, that the optical waveguide component 11 can be substantially completely isolated from force imposed on the connecting portion 32, 42, 52 due to a dimensional change of the housing 20 by utilization of the following equation based on Hooke's Law of linear elasticity:

$$F_o = (d \times A \times G')/t$$

where:

F$_o$: force imposed on the optical waveguide component 11;

d: displacement of the housing 20 relative to an initial position (determined at the time of connecting the optical waveguide component 11 to the housing 20) due to a dimensional change of the housing 20 caused by a variation in ambient conditions;

A: total area of a portion or portions of the optical waveguide component 11 fixed to the connecting portion 32, 42, 52;

G': shear modulus of the connecting portion 32, 42, 52; and t: thickness of the connecting portion 32, 42, 52 in a direction extending between the optical waveguide component 11 and the housing 20.

As is evident from this equation, the force F$_o$ transferred from the housing 20 to the optical waveguide component 11 by the connecting portion 32, 42, 52 is a function of the displacement d, the area A, the shear modulus G', and the thickness t. The force F$_o$ can be reduced by reducing the displacement d, the area A, or the shear modulus G' or by increasing the thickness t.

In the first embodiment, the force F$_o$ transferred to the optical waveguide component 11 through the connecting portion 32 is reduced by reducing the area A and increasing the thickness t. More specifically, the total area A of the portions of the optical waveguide component 11 fixed to the bodies of adhesive 34 and 34' (preferably about 5 to 30 mm$^2$) is significantly smaller than the total area of the portion of the optical waveguide component fixed to the adhesive in conventional optical devices (typically 80 mm$^2$) Also, the thickness t of the bodies of adhesive 34 and 34' (preferably about 1.2 mm) is significantly larger than in conventional optical devices (typically 0.1 to 0.5 mm).

In the second and third embodiments, the force F$_o$ transferred to the optical waveguide component 11 is reduced by reducing the shear modulus G' and increasing the thickness t. Specifically, the shear modulus G' of the support member 44 and the gel 54 (preferably less than about 2 psi) is significantly smaller than the shear modulus of the adhesive used in conventional optical devices (typically 100 to 1,000,000 psi). Also, the thicknesses t of the support member 44 and the gel 54 (each preferably about 0.8 mm) are significantly larger than in conventional optical devices (typically 0.1 to 0.5 mm).

In an embodiment of the invention using a molded casing portion 22, the force F$_o$ imposed on the optical waveguide component 11 can also be reduced by reducing, relative to conventional optical devices, the displacement d of the housing 20. More specifically, annealing the molded casing portion 22 significantly decreases permanent dimensional changes (displacement d) that would otherwise occur after the optical waveguide component 11 had been connected to the housing 20.

In a more preferred aspect of the present invention, the displacement d, the area A, the shear modulus G', and the thickness t are adjusted to limit the force F$_o$ such that it satisfies the following condition:

$$F_o < 0.10(F_h)$$

where:

F$_h$: force imposed on the connecting portion 32, 42, 52 due to a dimensional change of the housing caused by a variation in ambient conditions.

Although the isolation of the optical waveguide component 11 from the housing 20 has been described in connection with linear displacement of the housing 20, the present invention can isolate the optical waveguide component 11 from forces on the connecting portion due to other dimensional changes of the housing 20, such as twisting or bending. Those forces can be determined by the well-known principle of superposition.

Figure 7:
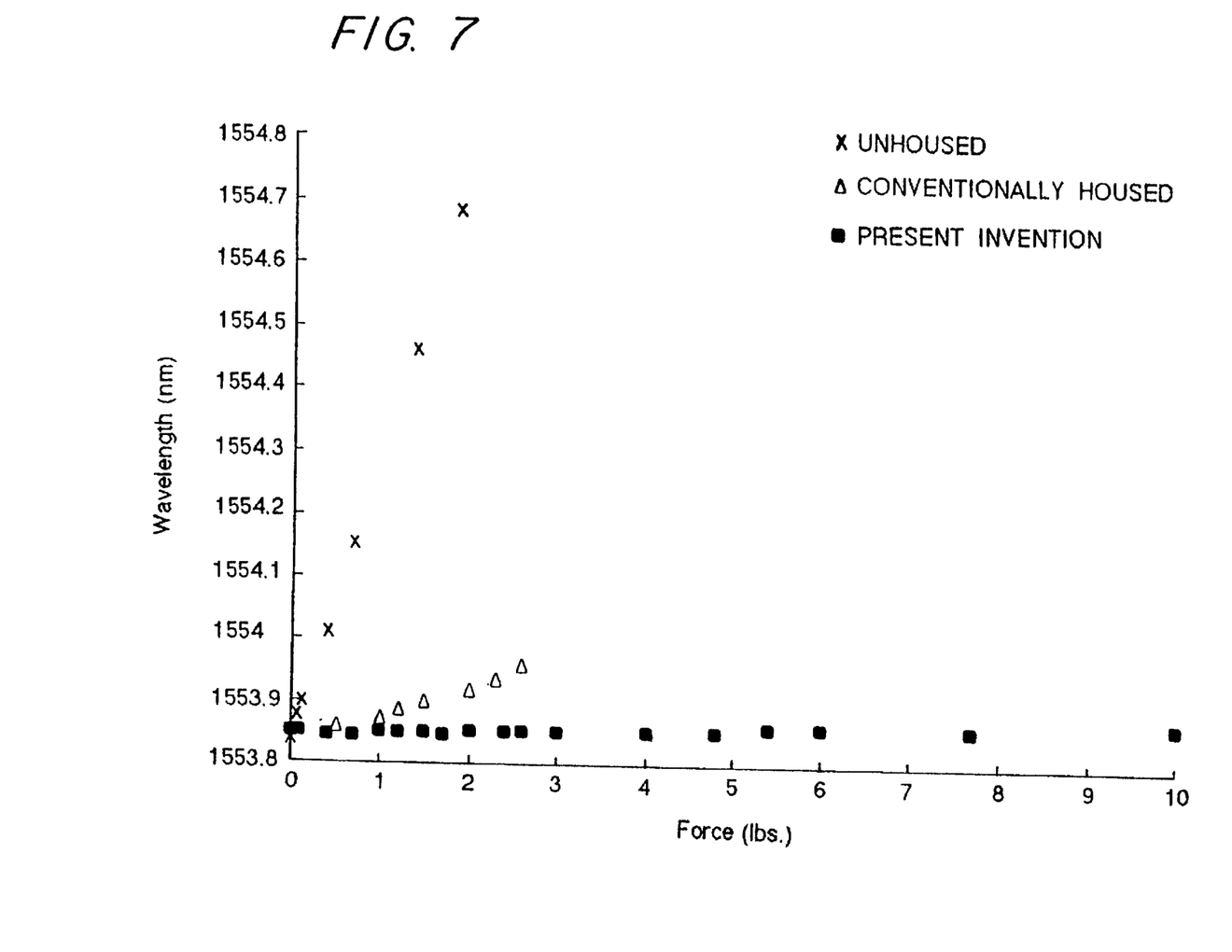
FIG. 7 is a graphic comparison of the wavelength shift caused by applying force to a fiber Bragg grating component, a conventional optical device with a fiber Bragg grating component, and an optical device with fiber Bragg grating component according to the present invention.

The ability of an optical device according to the present invention to substantially completely isolate the optical waveguide component 11 from force imposed on the connecting portion 32, 42, 52 due to a dimensional change of the housing 20 is demonstrated in FIG. 7, which shows the results of an experiment involving three optical devices. The first optical device was an unhoused, conventional fiber Bragg grating component having a beta-eucryptite glass-ceramic mounting member. The second optical device included the same type of conventional fiber Bragg grating component, but it was glued in the conventional manner (RTV-3145 silicone having an area A=80 mm$^2$ and a thickness t=0.4 mm) to a housing formed of VECTRA®. The third optical device included the same type of conventional fiber Bragg grating component, but it was connected to a housing formed of VECTRA® by a connecting portion in accordance with the first embodiment of the present invention (two bodies of RTV-3145 silicone adhesive with a total area A=17 mm$^2$ and a thickness t=0.8 mm).

Each of the optical devices was subjected to three-point, flexure testing, which involved supporting each optical device on opposite ends of its bottom surface and subjecting it to forces (i.e., changes in ambient conditions) imposed transversely to the optical device on the center of its top surface. The central wavelengths of the optical devices were measured as the forces were imposed.

As shown in FIG. 7, the central wavelength of the unhoused fiber Bragg grating component shifted by a significant amount in response to force. The central wavelength of the conventionally-housed fiber Bragg grating component shifted by a lesser, but nonetheless unacceptable, amount. The central wavelength of the optical device according to the present invention barely shifted.

In the optical device according to the present invention, the optical waveguide component is substantially completely isolated from force imposed on the connecting portion due to a dimensional change of the housing. In other words, the optical waveguide component is not subjected to loads under normal operating conditions that will cause its optical performance to deviate from acceptable tolerances.

It will be apparent to those skilled in the art that various modifications and variations can be made in the apparatus of the present invention without departing from the scope or spirit of the invention. For example, although preferred embodiments have been described with reference to an optical waveguide component having a Bragg grating, certain aspects of the invention may be applied to other optical waveguide components that are adversely affected by forces imposed thereon. A specific example is an optical waveguide component including an optical fiber with a long-period grating mounted on a mounting member (preferably a low-expansion substrate such as fused silica) to maintain constant tension in the grating over a temperature range. A long-period-grating component can be adversely affected by forces transferred from the housing and thus can benefit from the present invention. Certain aspects may also be applied to other suitable optical waveguide components, such as optical couplers or amplifiers.

As a further example, although the optical device of the first embodiment includes the spacer member having two holes, the spacer member could have one large hole for receiving the bodies of adhesive, or the spacer member could be eliminated altogether. As yet another example, although the optical waveguide component in the third embodiment is disposed on top of the gel, it could also be completely enveloped by is the gel.

The invention further includes the method of making the inventive optical device wherein the optical component is isolated from the housing. The inventive method includes the isolating of the optical component from the housing and other steps utilized in making the described inventive optical device.

Other embodiments of invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. An optical device comprising:
   an optical waveguide component;
   a housing for the optical waveguide component; and
   a connecting portion that attaches the optical waveguide component to the housing while substantially completely isolating the optical waveguide component from force imposed on the connecting portion due to a dimensional change of the housing caused by a variation in ambient conditions, wherein the connecting portion includes discrete bodies of adhesive that are bonded to the optical waveguide component and the housing.

2. The optical device of claim 1, wherein the optical waveguide component includes an optical fiber with a Bragg grating mounted on a mounting member.

3. The optical device of claim 1, wherein the optical waveguide component includes an optical fiber with a long-period grating mounted on a mounting member.

4. The optical device of claim 1, wherein the housing comprises a casing portion made of metal.

5. The optical device of claim 1, wherein the housing comprises a molded casing portion made of a material including a polymer.

6. The optical device of claim 5, wherein the molded casing portion has been subjected to post-molding annealing to limit a dimensional change of the housing caused by a variation in ambient conditions.

7. The optical device of claim 1, wherein the connecting portion has only two discrete bodies of adhesive that are bonded to the optical waveguide component and the housing.

8. The optical device of claim 1, further comprising a spacer member disposed between the optical waveguide component and the housing and having at least one hole that accommodates at least one of the bodies of adhesive.

9. The optical device of claim 8, wherein the spacer member includes a layer of elastomeric foam.

10. The optical device of claim 8, wherein each of the bodies of adhesive is accommodated in a different hole.

11. The optical device of claim 1, satisfying the following condition:

$$F_o < 0.10(F_h)$$

where:

$$F_o = (d \times A \times G')/t$$

and where:
$F_o$: force imposed on the optical waveguide component;
$F_h$: force imposed on the connecting portion due to a dimensional change of the housing caused by a variation in ambient conditions;
d: displacement of the housing due to a dimensional change of the housing caused by a variation in ambient conditions;
A: total area of portions of the optical waveguide component fixed to the bodies of adhesive;

G': shear modulus of the adhesive; and t: thickness of the bodies of adhesive in a direction extending between the optical waveguide component and the housing.

12. An optical device comprising:

an optical waveguide component;

a housing for the optical waveguide component; and a connecting portion that attaches the optical waveguide component to the housing while substantially completely isolating the optical waveguide component from force imposed on the connecting portion due to a dimensional change of the housing caused by a variation in ambient conditions, wherein the connecting portion includes a flexible support member disposed between the optical waveguide component and the housing and has at least a portion of one surface bonded to the optical waveguide component and at least a portion of another surface bonded to the housing, wherein the flexible support member includes a layer of elastomeric foam.

13. The optical device of claim 12, satisfying the following condition:

$$F_o < 0.10(F_h)$$

where:

$$F_o = (d \times A \times G')/t$$

and where:

$F_o$: force imposed on the optical waveguide component;

$F_h$: force imposed on the connecting portion due to a dimensional change of the housing caused by a variation in ambient conditions;

d: displacement of the housing due to a dimensional change of the housing caused by a variation in ambient conditions;

A: total area of a portion or portions of the optical waveguide component fixed to the one surface of the flexible support member;

G': shear modulus of the flexible support member; and, t: thickness of the flexible support member in a direction extending between the optical waveguide component and the housing.

14. An optical device comprising:

an optical waveguide component;

a housing for the optical waveguide component; and a connecting portion that attaches the optical waveguide component to the housing while substantially completely isolating the optical waveguide component from force imposed on the connecting portion due to a dimensional change of the housing caused by a variation in ambient conditions, wherein the connecting portion includes a flexible support member disposed between the optical waveguide component. and the housing and has at least a portion of one surface bonded to the optical waveguide component and at least a portion of another surface bonded to the housing, wherein the connecting portion includes a gel, and satisfying the following condition:

$$F_o < 0.10(F_h)$$

where:

$$F_o = (d \times A \times G')/t$$

and where:

$F_o$: force imposed on the optical waveguide component;

$F_h$: force imposed on the connecting portion due to a dimensional change of the housing caused by a variation in ambient conditions;

d: displacement of the housing due to a dimensional change of the housing caused by a variation in ambient conditions;

A: total area of a portion or portions of the optical waveguide component fixed to the gel;

G': shear modulus of the gel; and, t: thickness of the gel in a direction extending between the optical waveguide component and the housing.

15. An optical device comprising:

an optical waveguide component;

a housing for the optical waveguide component; and a connecting portion that attaches the optical waveguide component to the housing while substantially completely isolating the optical waveguide component from force imposed on the connecting portion due to a dimensional change of the housing caused by a variation in ambient conditions, and satisfying the following condition:

$$F_o < 0.10(F_h)$$

where:

$$F_o = (d \times A \times G')/t$$

and where:

$F_o$: force imposed on the optical waveguide component;

$F_h$: force imposed on the connecting portion due to a dimensional change of the housing caused by a variation in ambient conditions;

d: displacement of the housing due to a dimensional change of the housing caused by a variation in ambient conditions;

A: total area of a portion or portions of the optical waveguide component fixed to the connecting portion;

G': shear modulus of the connecting portion; and, t: thickness of the connecting portion in a direction extending between the optical waveguide component and the housing.

16. A method of making an optical device comprising:

providing an optical waveguide component;

providing a housing for the optical waveguide component; and attaching a connecting portion to the optical waveguide component and to the housing wherein said connecting portion attaches the component to the housing while substantially completely isolating the optical waveguide component from a force imposed on the connecting portion due to a dimensional change of the housing caused by a variation in ambient conditions, wherein attaching includes bonding discrete bodies of adhesive to the optical waveguide component and the housing.

17. The method of claim 16, wherein the optical waveguide component includes an optical fiber grating mounted on a mounting member.

18. The method of claim 16, wherein the step of providing a housing comprises providing a molded casing portion and post-molding annealing the molded casing portion to limit a dimensional change of the housing cause by a variation in ambient conditions.

19. The method of claim 16, wherein bonding comprises bonding only two discrete bodies of adhesive to the optical waveguide component and the housing.

20. The method of claim 16, further comprising the step of disposing a spacer member between the optical waveguide component and the housing, said spacer member having at least one hole that accommodates at least one of the bodies of adhesive.

21. The method of claim 16 wherein attaching includes satisfying the following condition:

$$F_o < 0.10(F_h)$$

where:

$$F_o = (d \times A \times G')/t$$

and where:
- $F_o$: force imposed on the optical waveguide component;
- $F_h$: force imposed on the connecting portion due to a dimensional change of the housing caused by a variation in ambient conditions;
- d: displacement of the housing due to a dimensional change of the housing caused by a variation in ambient conditions;
- A: total area of portions of the optical waveguide component bonded to the discrete bodies of adhesive;
- G': shear modulus of the adhesive; and
- t: thickness of the discrete bodies of adhesive in a direction extending between the optical waveguide component and the housing.

22. A method of making an optical device comprising:

providing an optical waveguide component;

providing a housing for the optical waveguide component; and attaching a connecting portion to the optical waveguide component and to the housing wherein said connecting portion attaches the component to the housing while substantially completely isolating the optical waveguide component from a force imposed on the connecting portion due to a dimensional change of the housing caused by a variation in ambient conditions, wherein attaching includes disposing a flexible support member between the optical waveguide component and the housing, bonding at least a portion of one surface of the flexible support member to the optical waveguide component and bonding at least a portion of another surface of the flexible support member to the housing, and wherein attaching includes satisfying the following condition:

$$F_o < 0.10(F_h)$$

where:

$$F_o = (d \times A \times G')/t$$

and where:
- $F_o$: force imposed on the optical waveguide component;
- $F_h$: force imposed on the connecting portion due to a dimensional change of the housing caused by a variation in ambient conditions;
- d: displacement of the housing due to a dimensional change of the housing caused by a variation in ambient conditions;
- A: total area of portions of the optical waveguide component fixed to the one surface of the flexible support member;
- G': shear modulus of the flexible support member; and,
- t: thickness of the flexible support member in a direction extending between the optical waveguide component and the housing.

23. A method of making an optical device comprising:

providing an optical waveguide component;

providing a housing for the optical waveguide component; and attaching a connecting portion to the optical waveguide component and to the housing wherein said connecting portion attaches the component to the housing while substantially completely isolating the optical waveguide component from a force imposed on the connecting portion due to a dimensional change of the housing caused by a variation in ambient conditions, wherein attaching includes attaching with a gel, and wherein attaching includes satisfying the following condition:

$$F_o < 0.10(F_h)$$

where:

$$F_o = (d \times A \times G')/t$$

and where:
- $F_o$: force imposed on the optical waveguide component;
- $F_h$: force imposed on the connecting portion due to a dimensional change of the housing caused by a variation in ambient conditions;
- d: displacement of the housing due to a dimensional change of the housing caused by a variation in ambient conditions;
- A: total area of a portion or portions of the optical waveguide component fixed to the gel;
- G': shear modulus of the gel; and,
- t: thickness of the gel in a direction extending between the optical waveguide component and the housing.

24. A method of making an optical device comprising:

providing an optical waveguide component;

providing a housing for the optical waveguide component; and attaching a connecting portion to the optical waveguide component and to the housing wherein said connecting portion attaches the component to the housing while substantially completely isolating the optical waveguide component from a force imposed on the connecting portion due to a dimensional change of the housing caused by a variation in ambient conditions, wherein attaching includes satisfying the following condition:

$$F_o < 0.10(F_h)$$

where:

$$F_o = (d \times A \times G')/t$$

and where:
- $F_o$: force imposed on the optical waveguide component;
- $F_h$: force imposed on the connecting portion due to a dimensional change of the housing caused by a variation in ambient conditions;
- d: displacement of the housing due to a dimensional change of the housing caused by a variation in ambient conditions;
- A: total area of a portion or portions of the optical waveguide component fixed to the connecting portion;
- G': shear modulus of the connecting portion; and,
- t: thickness of the connecting portion in a direction extending between the optical waveguide component and the housing.

* * * * *